(12) United States Patent
Kindred et al.

(10) Patent No.: US 7,835,738 B1
(45) Date of Patent: Nov. 16, 2010

(54) METHOD AND SYSTEM FOR MANAGING CALL AUTHORIZATIONS FOR PREPAID WIRELESS SERVICE

(75) Inventors: Russell G. Kindred, Lake Quivira, KS (US); Ronald J. Rice, Lenexa, KS (US); Thomas M. Sladek, Overland Park, KS (US); Anthony J. Wageman, Lee's Summit, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 870 days.

(21) Appl. No.: 11/505,688

(22) Filed: Aug. 17, 2006

(51) Int. Cl.
*H04W 88/02* (2009.01)
(52) U.S. Cl. ...................................................... 455/433
(58) Field of Classification Search ................ 370/208, 370/235, 317; 455/405, 406, 408, 414.1; 379/142.01, 93.17, 161, 183, 211.02, 245–249; 340/870.09, 870.1, 870.13
See application file for complete search history.

(56) References Cited

U.S. PATENT DOCUMENTS

| | | | |
|---|---|---|---|
| 5,301,234 A * | 4/1994 | Mazziotto et al. | 380/247 |
| 6,185,414 B1 | 2/2001 | Brunner et al. | |
| 6,496,690 B1 | 12/2002 | Cobo et al. | |
| 6,738,647 B1 * | 5/2004 | Link, II | 455/564 |
| 6,741,687 B1 | 5/2004 | Coppage | |
| 7,185,304 B2 * | 2/2007 | Suto et al. | 716/9 |
| 7,221,929 B2 * | 5/2007 | Lee et al. | 455/408 |
| 7,333,809 B2 * | 2/2008 | Engelhart | 455/432.3 |
| 7,366,136 B1 * | 4/2008 | Kalbag et al. | 370/329 |
| 2007/0021102 A1 * | 1/2007 | Sherman | 455/408 |
| 2007/0105529 A1 * | 5/2007 | Lundstrom et al. | 455/405 |

OTHER PUBLICATIONS

"Cellular Radiotelecomminucations Intersystems Operations," ANSI/TIA/EIA-41-D-97, corresponding to the version published Dec. 1997.
"Wireless Intelligent Network," TIA/EIA/IS-771, corresponding to the version published Jul. 1999.

* cited by examiner

*Primary Examiner*—Diane Mizrahi

(57) ABSTRACT

A prepaid service platform monitors a prepaid balance for a mobile station that operates in accordance with a prepaid wireless service plan. When the prepaid balance reaches a predetermined value, such as zero, the prepaid service platform signals to the mobile station's home location register (HLR). In response, the HLR changes at least one call authorization in an HLR profile for the mobile station and also signals to the serving system currently serving the mobile station. The serving system responsively changes at least one call authorization in a serving-system profile for the mobile station. As a result of these changes to the mobile station's call authorizations, the mobile station may be prevented from making and/or receiving chargeable calls.

20 Claims, 2 Drawing Sheets

METHOD AND SYSTEM FOR MANAGING CALL AUTHORIZATIONS FOR PREPAID WIRELESS SERVICE

BACKGROUND

1. Field of the Invention

The present invention relates to telecommunications and, more particularly, to methods and systems for managing call authorizations for a mobile station that operates in accordance with a prepaid wireless service plan.

2. Description of Related Art

Many wireless service providers offer prepaid wireless service plans in which a customer pays a certain amount in advance to fund a prepaid balance. The prepaid balance is then decremented in accordance with the customer's wireless usage. In many cases, the prepaid balance is monitored and decremented in real time, i.e., at the same time the customer uses wireless services. That way, when the customer's prepaid balance falls to zero or to some other low value while the customer is involved a call, the wireless network may interrupt the call to warn the customer of the low balance or may disconnect the call.

Such real-time control over the provisioning of prepaid wireless service often requires timely communication between various elements of the wireless network. For example, a prepaid service platform, such as a service control point (SCP), may communicate with a mobile switching center (MSC) to control the prepaid wireless services that are provided to mobile stations operating in the MSC's service area. However, when such communications fail, e.g., due to network outages, or are delayed, the wireless network may not be able to adequately limit a customer's wireless usage based on the customer's prepaid balance. As a result, a customer might still be able to use wireless service, e.g., to make or receive chargeable calls, even after the customer's prepaid balance is depleted.

Accordingly, there is a need for additional methods and systems for controlling a prepaid customer's usage of wireless service.

SUMMARY

In a first principal aspect, an exemplary embodiment provides a method for call authorization management in a wireless telecommunications network that provides prepaid wireless service to a mobile station. The wireless telecommunications network includes a serving system currently serving the mobile station, a home location register (HLR), and a prepaid service platform, wherein the serving system allows the mobile station to originate and terminate calls as authorized by a serving-system profile for the mobile station. In accordance with the method, the prepaid service platform determines that a prepaid balance for the mobile station has reached a predetermined value and responsively sends a first directive to the HLR. In response to the first directive, the HLR sends a second directive to the serving system. In response to the second directive, the serving system changes at least one call authorization in the serving-system profile.

In a second principal aspect, an exemplary embodiment of the present invention provides a system for providing prepaid wireless service to a mobile station. The system comprises a home location register (HLR) storing an HLR profile for the mobile station and a service control point (SCP) configured to monitor a prepaid balance for the mobile station and to send a first directive to the HLR when the prepaid balance reaches a predetermined value. The first directive includes at least one new call authorization indicator. The HLR is configured to replace at least one HLR call authorization indicator in the HLR profile with the at least one new call authorization indicator and to save the at least one HLR call authorization indicator in response to the first directive.

DETAILED DESCRIPTION OF EXEMPLARY EMBODIMENTS

1. Overview

Figure 1:
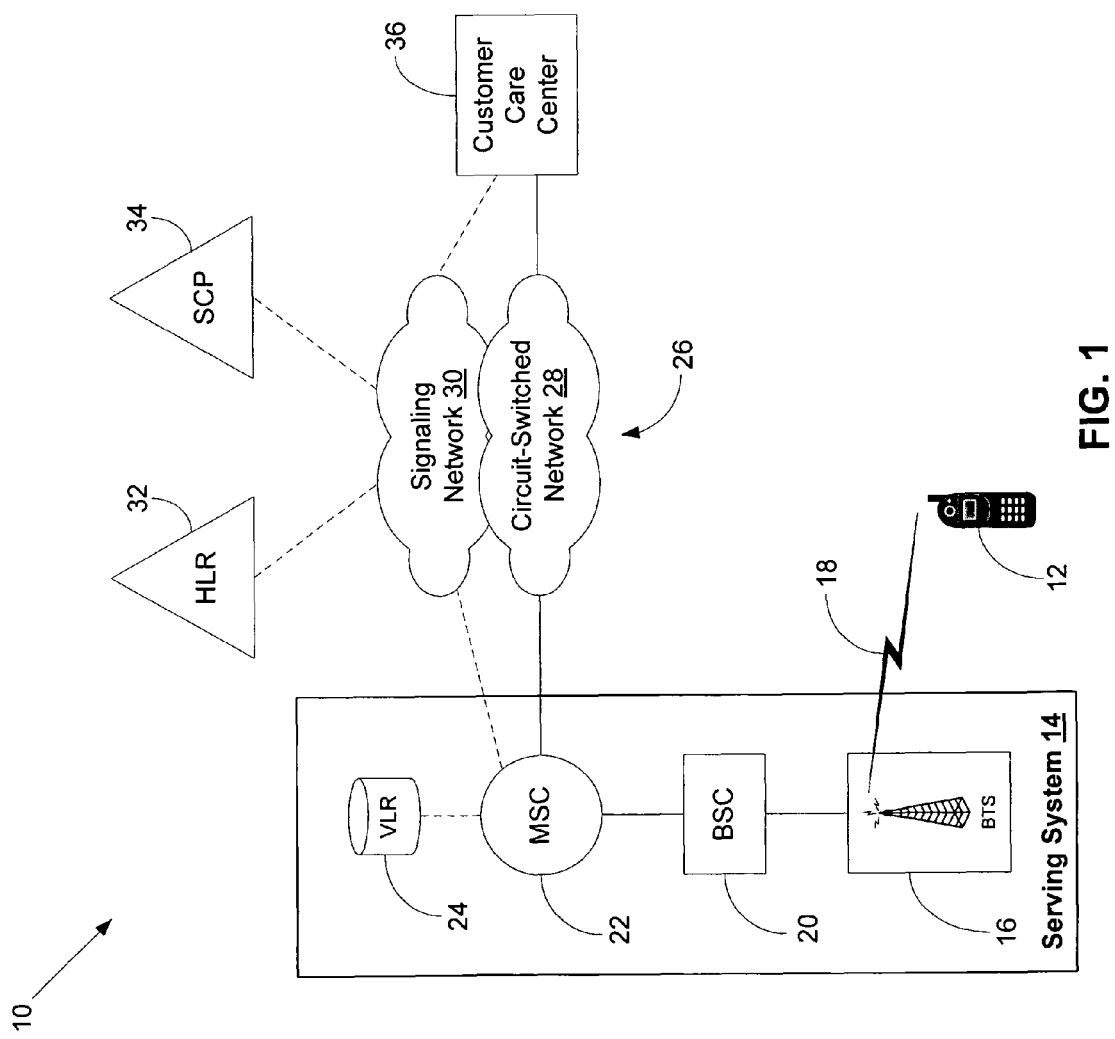
FIG. 1 is a block diagram of a wireless telecommunications network, in accordance with an exemplary embodiment.

When the prepaid balance for a mobile station reaches a predetermined value (e.g., zero), one or more call authorizations in the mobile station's profile may be changed in order to prevent the mobile station from making and/or receiving chargeable calls.

For example, a prepaid service platform may determine that the prepaid balance for a mobile station has reached a zero value. In response, the prepaid service platform may send a directive to the mobile station's home location register (HLR), directing the HLR to change one or more call authorizations for the mobile station. The call authorizations may be part of an HLR profile that the HLR stores for the mobile station.

In response to the directive from the prepaid service platform, the HLR may change a call origination authorization and/or a call termination authorization in the HLR profile, in order to limit the mobile station's ability to make and/or receive chargeable calls. The HLR may also send a directive to the serving system currently serving the mobile station, directing the serving system to change one or more call authorizations for the mobile station. The call authorizations may be part of a serving-system profile that the serving system stores for the mobile station.

In response to the directive from the HLR, the serving system may change a call origination authorization and/or a call termination authorization in the serving-system profile, in order to limit the mobile station's ability to make and/or receive chargeable calls. For example, if the serving system thereafter receives a call origination request from the mobile station to originate a call to a requested destination, the serving system may handle the call origination request in accordance with the changed call origination authorization by routing the call to a customer care center instead of the requested destination. The customer care center may provide options for replenishing the mobile station's prepaid balance.

The mobile station's ability to receive calls may also be limited by the changed call authorizations in the serving-system profile. For example, if the serving system receives a request to terminate a call to the mobile station, the serving system may deny the termination request and, thereby, prevent the mobile station from receiving the call.

Changing one or more call authorizations in this way may beneficially provide an additional mechanism for preventing a mobile station with a zero prepaid balance from making and/or receiving chargeable calls. In particular, the prepaid service platform may normally control the provision of prepaid wireless service by the serving system. However, if communication between the prepaid service platform and the serving system fails, the serving system may still apply the call authorizations in the mobile station's profile.

However, the changes to the mobile station's call authorizations may only be temporary. For example, the original call authorizations may simply be suspended pending replenishment of the mobile station's prepaid balance. In this way, if the mobile station's prepaid balance is replenished, the mobile station's original call authorizations may be restored.

2. Exemplary Network Architecture

FIG. 1 illustrates an exemplary wireless telecommunications network 10 for providing prepaid wireless service to mobile stations, such as mobile station 12. Mobile station 12 could be a wireless telephone, wireless personal digital assistant (PDA), wirelessly-equipped laptop computer, or other wireless communication device. In FIG. 1, connections that carry primarily voice or other media are shown as solid lines and connections that carry primarily signaling are shown as dashed lines.

Network 10 may include a serving system 14 that is currently serving mobile station 12. In an exemplary embodiment, serving system 14 includes a base transceiver station (BTS) 16 that communicates with mobile station 12 via an air interface 18. The air interface communications may use a protocol such as cdma2000 or EV-DO. However, other protocols could be used. BTS 16 may be controlled by a base station controller (BSC) 20, which may, in turn, be controlled by a mobile switching center (MSC) 22.

MSC 22 may be communicatively coupled to a visitor location register (VLR) 24 that stores profiles for mobile stations currently being served by serving system 14. Thus, VLR 24 may store a serving-system profile for mobile station 12. The serving-system profile may include various types of information regarding mobile station 12. For example, the serving-system profile may include authorizations for communication services, e.g., based on the services to which the user of mobile station 12 has subscribed. Serving system 14 may refer to the serving-system profile of mobile station 12 when requested to provide communication services involving mobile station 12. The serving system 14 then might provide the requested communication services only to the extent that they are authorized by the serving-system profile. Although FIG. 1 shows MSC 22 and VLR 24 as separate network elements, it is to be understood that they could be integrated together so as to function as a single network element.

MSC 22 may be connected to public switched telephone network (PSTN) 26. PSTN 26 may use an out-of-band signaling system, such as Signaling System 7 (SS7) to route calls. Thus, PSTN 26 may include a circuit-switched network 28 that carries bearer traffic, i.e., the voice or other media in calls, and a signaling network 30 that carries signaling traffic used to set up, tear down, monitor, and control calls. Circuit-switched network 28 may include a plurality of trunks, with each trunk carrying media in a time division multiplex (TDM) format. Signaling network 30 may include a plurality of networked signal transfer points (STPs).

MSC 22 may communicate with signaling network 30, e.g., using SS7, to route calls via circuit-switched network 28 to and from mobile stations, such as multi-mode mobile station 12, that are currently being served by serving system 14. MSC 22 may also communicate with other network elements via signaling network 30. For example, MSC 22 may communicate with a home location register (HLR) 32 of mobile station 12.

HLR 32 may store an HLR profile for mobile stations, such as mobile station 12. The HLR profile for mobile station 12 may include the same or similar information as the serving-system profile. Thus, the HLR profile may include authorizations for various communication services. Moreover, serving system 14 may obtain the profiles for the mobile stations it is serving from HLR 32, for example, through a registration process. Thus, when mobile station 12 successfully registers, serving system 14 may obtain a profile for mobile station 12 from HLR 32 and store it in VLR 24 as the serving-system profile for mobile station 12.

The communications between MSC 22 and HLR 32 may conform to IS-41 specifications. A version of the IS-41 specifications, ANSI/TIA/EIA-41-D-97, published in December 1997, is incorporated herein by reference. The IS-41 signaling may be carried in signaling network 30 as an SS7 application layer.

MSC 22 may also communicate with a service control point (SCP) 34 via signaling network 30. MSC 22 and SCP 34 may communicate such that SCP 34 controls certain services provided by serving system 14. The communications between MSC 22 and SCP 34 may conform to IS-771 specifications. A version of the IS-771 specifications, "Wireless Intelligent Network," TIA/EIA/IS-771, published in July 1999, is incorporated herein by reference. The IS-771 signaling may be carried in signaling network 30 as an SS7 application layer.

In the example illustrated in FIG. 1, SCP 34 functions as a prepaid service platform. Thus, MSC 22 and SCP 34 may communicate using IS-771 signaling so that SCP 34 controls the provision of wireless prepaid service to mobile stations, such as mobile station 12. In this regard, the serving-system profile for a mobile station that uses wireless prepaid service (e.g., mobile station 12) may include triggers that cause serving system 14 to query SCP 34 for call processing instructions, e.g., in response to call requests involving the mobile station. For example, when serving system 14 receives a call origination request from mobile station 12, a trigger in the serving-system profile for mobile station 12 may cause serving system 14 to query SCP 34 for instructions. Similarly, when serving system 14 receives a call termination request to terminate a call to mobile station 12, a trigger in the serving-system profile for mobile station 12 may cause serving system 14 to query SCP 34 for instructions. SCP 34 may respond to such queries with instructions to serving system 14 for handling the call. In this way, SCP 34 may monitor the usage of mobile station 12 and may instruct serving system 14 to deny requests to originate or terminate chargeable calls or to cut off existing calls involving mobile station 12 when the prepaid balance for mobile station 12 reaches zero.

However, as described in more detail below, the call authorizations in the serving-system profile of mobile station 12 may also be used to inhibit chargeable calls when the prepaid balance of mobile station 12 becomes depleted. This fall-back mechanism may become important, for example, when communications between MSC 22 and SCP 34 fail. In particular, SCP 34 may communicate with HLR 32 to change call authorizations for mobile station 12 when SCP 34 determines that the prepaid balance for mobile station 12 has reached a predetermined value (e.g., zero). SCP 34 may communicate with HLR 32 via signaling network 30 using IS-771 signaling. Alternatively, SCP 34 may communicate with HLR 32 via an Internet Protocol (IP) network, for example, using TCP/IP communications. HLR 32 may then communicate with serving system 14 to change call authorizations for mobile station 12.

Once serving system 14 changes call authorizations for mobile station 12, chargeable calls involving mobile station 12 may be inhibited. For example, if mobile station 12 subsequently attempts to originate a call to a desired destination, serving system 14 may instead route the call through PSTN 26 to a customer care center 36. Customer care center 36 may include a live operator and/or an interactive voice response (IVR) system with which the user of mobile station 12 may communicate (e.g., using voice and/or DTMF tones) to replenish the prepaid balance for mobile station 12. If the prepaid balance is replenished in this way, then customer care center 36 may communicate the replenishment to SCP 34, e.g., via signaling network 30. SCP 34 may then direct HLR 32, and HLR 32 may direct serving system 14, to restore the call authorizations for mobile station 12. In some cases, SCP 34 may determine whether the replenishment is sufficient to restore the call authorizations. In some implementations, any non-zero balance may be sufficient. In other implementations, the prepaid balance must be replenished to a predetermined level in order to restore the call authorizations.

In this way, call authorizations for a mobile station 12 may be suspended until the prepaid balance is replenished, for example, by communicating with customer care center 36. While the call authorizations are suspended, serving system 14 may beneficially prevent mobile station 12 from making and receiving chargeable calls, even when the normal means of controlling the provision of prepaid wireless service (i.e., communicating with SCP 34 or other prepaid service platform) is unavailable.

3. Exemplary Operation

Figure 2:
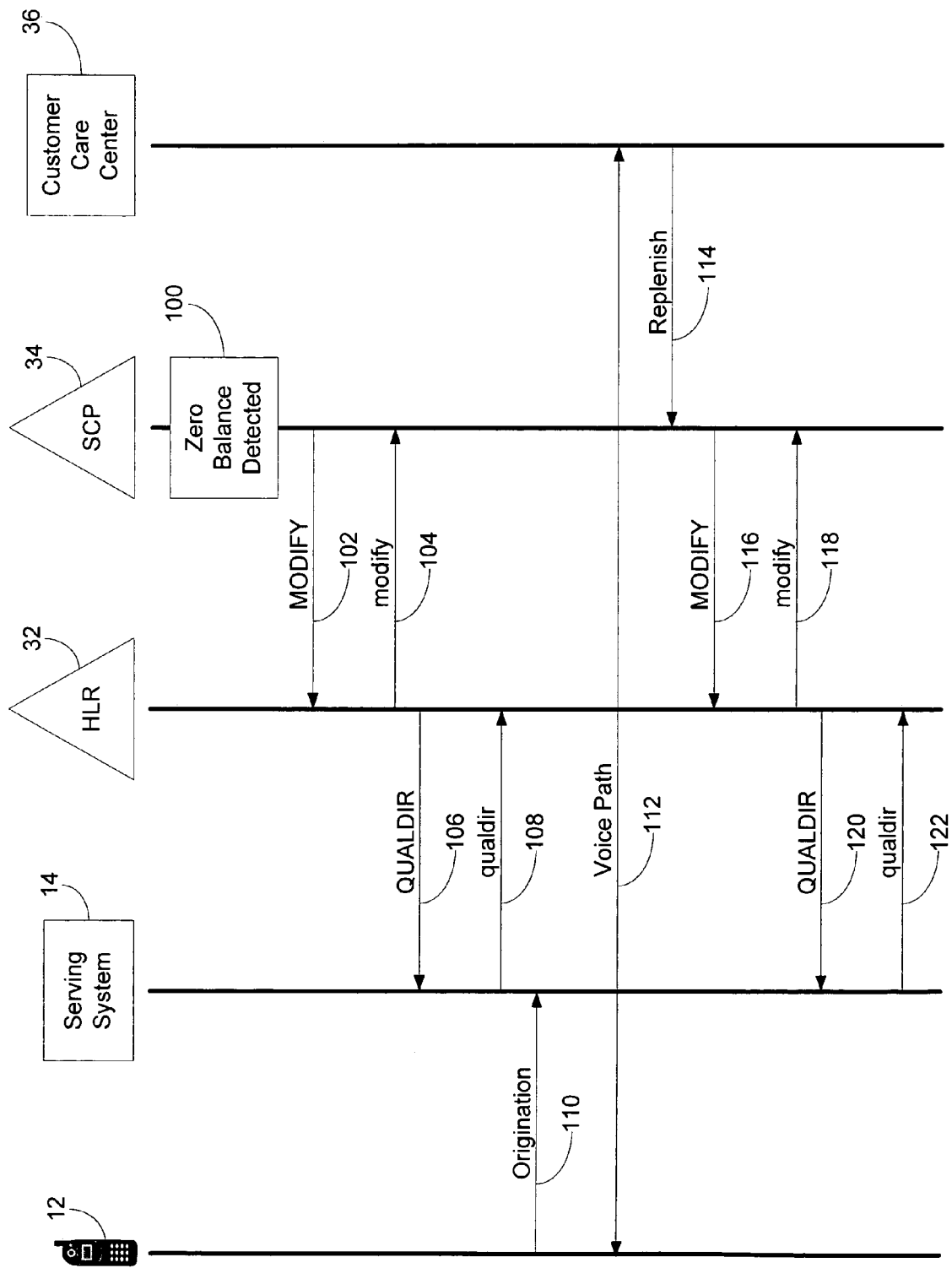
FIG. 2 is a simplified call flow diagram, in accordance with an exemplary embodiment.

FIG. 2 is a simplified call flow diagram illustrating an exemplary method of operation. The call flow of FIG. 2 assumes the network architecture illustrated in FIG. 1. However, it is to be understood that other network architectures could be used. In addition, the call flow of FIG. 2 uses IS-771 and IS-41 signaling. However, other types of signaling could be used.

The process may begin when SCP 34, functioning as a prepaid service platform, detects that the prepaid balance for mobile station 12 has reached zero, as indicated by step 100. In response, SCP 34 may send a directive to HLR 32, such as an IS-771 MODIFY message, directing HLR 32 to change one or more call authorizations for mobile station 12, as indicated by step 102.

The directive may identify mobile station 12, for example, by its mobile directory number (MDN) and may include one or more new call authorization indicators, such as an origination authorization indicator and/or termination authorization indicator. For example, the directive may include an origination authorization indicator (e.g., the numerical value "8") that indicates that mobile station 12 is not authorized to make chargeable calls. Mobile station 12 might still be allowed to make certain calls, for example, 9-1-1 calls or other emergency calls. However, the origination authorization indicator may indicate that all other call originations are to be denied. More particularly, the origination authorization indicator may indicate that calls originated by mobile station 12 should be routed to a designated destination, such as call customer care center 36. Thus, the directive from SCP 34 may include a routing address for routing calls to customer care center 36. The directive from SCP 34 may also include a termination authorization indicator (e.g., the numerical value "2") that indicates that mobile station 12 is not authorized to receive chargeable calls.

In response to the directive from SCP 34, HLR 32 may change the call authorizations in the HLR profile for mobile station 12. In particular, the profile for mobile station 12 may initially include an initial origination authorization indicator and an initial termination authorization indicator, and the initial indicators may indicate that mobile station 12 is authorized to make and receive chargeable calls. However, in response to the directive from SCP 34, HLR 32 may replace the initial origination and termination authorization indicators with the new origination and termination authorization indicators contained in the directive. HLR 32 may also save the initial origination and termination authorization indicators so that they may be restored at a later time, for example, when the prepaid balance for mobile station 12 is replenished.

In some cases, SCP 34 may determine the initial origination and termination authorization indicators in the HLR profile for mobile station 12 before sending the directive of step 102. For example, SCP 34 may send HLR 32 an IS-771 SEARCH request to determine the initial origination and/or termination authorization indicators in the HLR profile of mobile station 12 before sending the IS-771 MODIFY message with new origination and termination authorization indicators. SCP 34 may do this, for example, in order to verify the status of the HLR profile of mobile station 12.

HLR 32 may respond to the IS-771 MODIFY message from SCP 34 by sending an IS-771 modify return result, as indicated by step 104. HLR 32 may also send a directive to serving system 14, such as an IS-41 QUALDIR message, directing serving system 14 to change one or more call authorizations for mobile station 12, as indicated by step 106. The directive from HLR 32 may identify mobile station 12, e.g., by MDN, and may include the new origination authorization indicator, new termination authorization indicator, and routing address for customer care center 36 that were included in the directive from SCP 34.

In response to the directive from HLR 32, serving system 14 may change the call authorizations in the serving-system profile (e.g., stored in VLR 24) for mobile station 12. In particular, serving system 14 may replace initial origination and termination authorization indicators in the serving-system profile with the new origination and termination authorization indicators. In this way, serving system 14 may change the serving-system profile for mobile station 12 to reflect the changes made to the HLR profile for mobile station 12. Serving system 14 may also save the initial origination and termination authorization indicators so that they can be restored at a later time. Serving system 14 may also respond to the IS-41 QUALDIR message by sending HLR 32 an IS-41 qualdir return result, as indicated by step 108.

Some time after serving system 14 has changed the call authorizations for mobile station 12, mobile station 12 may send serving system 14 a call origination request, as indicated by step 110. The call origination request may include dialed digits to indicate a desired destination. However, in accordance with the new origination authorization indicator in the serving-system profile for mobile station 12, serving system 14 instead routes the call to customer care center 36 so as to establish a voice path between mobile station 12 and customer care center 36, as indicated by step 112. The user of mobile station 12 may then communicate with customer care center 36 in order to replenish the prepaid balance for mobile station 12. If the prepaid balance is replenished in this way, customer care center 36 may send a replenishment message to SCP 34, as indicated by step 114. The replenishment message may indicate a new prepaid balance for mobile station 12.

In response to the replenishment message, SCP 34 may send HLR 32 a directive, such as an IS-771 MODIFY message, directing HLR 32 to restore the call authorizations for mobile station 12, as indicated by step 116. In response, HLR 32 may restore the initial origination and termination authorization indicators back into the HLR profile for mobile station 12, and HLR 32 may send SCP 34 an IS-711 modify return result message, as indicated by step 118.

HLR 32 may also send serving system 14 a directive, such as an IS-41 QUALDIR message, directing serving system 14 to restore the call authorizations for mobile station 12. In response, serving system 14 may restore the initial origination and termination authorization indicators back into the serving-system profile for mobile station 12. Serving system 14 may also send HLR 32 an IS-41 qualdir return result message, as indicated by step 122. With the initial call authorizations in the HLR profile and the serving-system profile for mobile station 12 now restored, mobile station 12 may once again be able to make and receive chargeable calls.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for call authorization management in a wireless telecommunications network that provides prepaid wireless service to a mobile station, in which said wireless telecommunication network includes a serving system currently serving said mobile station, a home location register (HLR), and a prepaid service platform, and said serving system allows said mobile station to originate and terminate calls as authorized by a serving-system profile for said mobile station, said method comprising:

said prepaid service platform determining that a prepaid balance for said mobile station has reached a predetermined value and responsively sending a first directive to said HLR;

in response to said first directive, said HLR sending a second directive to said serving system; and in response to said second directive, said serving system changing at least one call authorization in said serving-system profile.

2. The method of claim 1, in which said serving system includes a mobile switching center (MSC).

3. The method of claim 1, in which said serving system includes a visitor location register (VLR) that stores said serving-system profile.

4. The method of claim 1, in which said prepaid service platform is a service control point (SCP).

5. The method of claim 1, in which changing at least one call authorization in said serving-system profile comprises:

replacing a first origination authorization indicator in said serving-system profile with a second origination authorization indicator.

6. The method of claim 5, further comprising:

said serving system receiving a call origination request from said mobile station to originate a call to a requested destination; and said serving system handling said call origination request in accordance with said second origination authorization indicator.

7. The method of claim 6, wherein in which said serving system handling said call origination request in accordance with said second origination authorization indicator comprises:

routing said call to a customer care center instead of said requested destination.

8. The method of claim 1, in which changing at least one call authorization in said serving-system profile comprises:

replacing a first termination authorization indicator in said serving-system profile with a second termination authorization indicator.

9. The method of claim 8, further comprising:

said serving system receiving a call termination request to terminate a call to said mobile station; and said serving system handling said call termination request in accordance with said second termination authorization indicator.

10. The method of claim 9, in which said serving system handling said call termination request in accordance with said second termination authorization indicator comprises:

said serving system denying said call termination request.

11. The method of claim 1, in which said predetermined value is zero.

12. The method of claim 11, in which said HLR stores an HLR profile for said mobile station, further comprising:

in response to said first directive, said HLR changing at least one call authorization in said HLR profile.

13. The method of claim 12, further comprising:

said prepaid service platform determining that said prepaid balance for said mobile station has been replenished and responsively sending a third directive to said HLR;

in response to said third directive, said HLR restoring said at least one call authorization in said HLR profile and sending a fourth directive to said serving system; and in response to said fourth directive, said serving system restoring said at least one call authorization in said serving-system profile.

14. A system for providing prepaid wireless service to a mobile station, said system comprising:

a home location register (HLR), said HLR storing an HLR profile for said mobile station; and a prepaid service platform configured to monitor a prepaid balance for said mobile station and to send a first directive to said HLR when said prepaid balance reaches a predetermined value, said first directive including at least one new call authorization indicator, in which said HLR is configured to replace at least one HLR call authorization indicator in said HLR profile with said at least one new call authorization indicator and to save said at least one HLR call authorization indicator in response to said first directive.

15. The system of claim 14, further comprising:

a serving system storing a serving-system profile for said mobile station.

16. The system of claim 15, in which said HLR is further configured to send a second directive to said serving system in response to said first directive, said second directive including said at least one new call authorization indicator.

17. The system of claim 16, in which said serving system is configured to replace at least one serving-system call authorization indicator in said service-system profile with said at least one new call authorization indicator and to save said at least one serving-system call authorization indicator in response to said second directive.

18. The system of claim 14, in which said prepaid service platform is a service control point (SCP).

19. The system of claim 14, further comprising:

a customer care center configured to receive instruction from said mobile station to replenish said prepaid balance and to communicate any replenishment to said prepaid service platform.

20. The system of 19, in which said prepaid service platform is configured to send a restore directive to said HLR when said prepaid balance is replenished and said HLR is configured to restore said at least one HLR call authorization indicator in said HLR profile in response to said restore directive.

* * * * *